United States Patent [19]

Swensen et al.

[11] Patent Number: 5,716,052
[45] Date of Patent: Feb. 10, 1998

[54] PRESSURE-ENERGIZED SEALING RINGS

[75] Inventors: Jeffrey E. Swensen, Eldersburg; Robert A. Barrett, Crofton, both of Md.

[73] Assignee: EG&G Pressure Science, Inc., Beltsville, Md.

[21] Appl. No.: 707,586

[22] Filed: Sep. 5, 1996

Related U.S. Application Data

[63] Continuation of Ser. No. 302,467, Sep. 12, 1994, Pat. No. 5,630,593.

[51] Int. Cl.$^6$ ............................................. F16J 15/16
[52] U.S. Cl. ........................ 277/27; 277/206 R; 277/236
[58] Field of Search .............................. 277/200, 205, 277/206 R, 207 A, 208, 209, 210, 212 C, 236; 285/111, 112, 917

[56] References Cited

U.S. PATENT DOCUMENTS

| | | | |
|---|---|---|---|
| 1,609,283 | 12/1926 | Bailey | 277/236 |
| 2,263,756 | 11/1941 | Bowers | 308/44 |
| 2,466,474 | 4/1949 | Phillips | 277/200 |
| 2,569,778 | 10/1951 | Phillips | 277/200 |
| 3,012,302 | 12/1961 | Waite | 288/31 |
| 3,192,690 | 7/1965 | Taylor | 220/46 |
| 3,204,971 | 9/1965 | Meriano | 277/171 |
| 3,272,521 | 9/1966 | McNenney | 277/205 |
| 3,595,588 | 7/1971 | Rode | 277/206 R |
| 3,633,928 | 1/1972 | Smith | 277/206 R |
| 3,797,836 | 3/1974 | Halling | 277/200 |
| 4,067,585 | 1/1978 | Rode | 277/200 |
| 4,121,843 | 10/1978 | Halling | 277/200 |
| 4,218,067 | 8/1980 | Halling | 277/205 |
| 4,361,335 | 11/1982 | Vinciguerra | 277/204 |
| 4,477,086 | 10/1984 | Feder et al. | 277/26 |
| 4,589,666 | 5/1986 | Halling | 277/200 |
| 4,602,795 | 7/1986 | Lillibridge | 277/236 |
| 4,602,888 | 7/1986 | Court et al. | 403/28 |
| 4,759,555 | 7/1988 | Halling | 277/200 |
| 4,779,901 | 10/1988 | Halling | 285/917 |
| 4,784,397 | 11/1988 | Tozer | 277/236 |
| 5,249,814 | 10/1993 | Halling | 277/206 |
| 5,436,576 | 7/1995 | Rode | 277/205 |

FOREIGN PATENT DOCUMENTS

| | | | |
|---|---|---|---|
| 550298 | 3/1923 | France | 277/206 R |
| 181255 | 6/1958 | Sweden | 277/206 R |
| 444217 | 3/1936 | United Kingdom . | |

OTHER PUBLICATIONS

Nicholson's Aircraft Seal Ltd.—Catalog for Corruplus Gaskets—Issue VI; May 1985.

*Primary Examiner*—Daniel G. DePumpo
*Attorney, Agent, or Firm*—Roylance, Abrams, Berdo & Goodman, L.L.P.

[57] ABSTRACT

A pressure-energized sealing ring having a bight portion, a first leg portion and a second leg portion for providing a fluid-tight seal between a pair of components. The first and second leg portions include a curved section having first and second sealing surfaces. The sealing surfaces are spaced from the free ends of the leg portion. The free ends of the leg portions are positioned between the bight portion and the sealing surfaces so that the ends of the seal are located in the area of low pressure. Accordingly, when sealing ring is a multi-ply seal, the free ends of the seal are positioned in the low pressure area so that the high pressure does not separate the seal. The curved sections of the leg portions and the curve of the bight portion securely couple the plies together without welding. Preferably, the plies are connected together and in intimate contact at their interfaces therebetween. In some embodiments, the leg portions include planar or crowned sections so that the sealing surfaces are faced farther from the bight portions to lower the contact force and stress level in the bight portion. In other embodiments, the bight portion has at least one convolution. Still in other embodiments, the sealing ring is arranged for an externally pressurized-type application.

22 Claims, 7 Drawing Sheets

PRESSURE-ENERGIZED SEALING RINGS

This is a continuation of application Ser. No. 08/302,467 filed Sep. 12, 1994 now U.S. Pat. No. 3,630,593.

FIELD OF THE INVENTION

The invention relates to fluid-tight sealing rings which are pressure-energized for confining fluid at high temperatures and pressures. More specifically, this invention relates to single ply and multi-ply sealing rings with improved sealing contact and lower localized stress.

BACKGROUND OF THE INVENTION

Resilient, metallic sealing rings are currently utilized in a wide variety of applications due to their ability to repeatedly accommodate large variations in lengths due to thermal expansions and contractions of assemblies surrounding them and/or engaging them in sealing contact. For example, in the hot sections of an aircraft gas turbine engine, a seal must be created between components that are at variable distances from one another, depending upon the sum of manufacturing tolerances on several components in the assembly and on relative thermal expansion during operation of the engine. The seal must be capable of conforming to out-of-flat flanges or surfaces to provide low leakage.

Accordingly, numerous types and shapes of seals have been employed to prevent fluid from escaping from a joint in ducting systems or other components. Joints in the fluid path or in components having high pressures often use pressure-energized seals or sealing rings between their joints or components. These sealing rings are resilient due to their material and their geometric design so that the sealing ring fills the gap between the adjacent members. The desired result is that the sealing ring will firmly abut both members at all points along the seal so that the gap is completely blocked by the sealing ring.

There are currently many types of sealing rings, including C-shaped sealing rings, V-shaped sealing rings, multiple convolution-type sealing rings, etc. Examples of convolution-type sealing rings which are particularly well suited for applications described above, include U.S. Pat. Nos. 3,797,836 and 4,121,843 to Halling. Sealing rings described therein have a single-ply construction.

Multi-ply seals also have been developed for certain situations in which a single ply seal is unsuitable. One example of a multiple ply seal is found in U.S. Pat. No. 3,012,302 to Waite. The Waite patent discloses a sealing ring having three separate elements nested together to form a three-ply structure. The opposite free ends of the three plies are formed to extend axially so that the sealing line passes through the free ends. Since the free ends are not connected to each other, high pressure fluid may enter the interstitial spaces between the ply. This could result in a high air pressure-induced stress in the outer ply. This stress would be doubled, for example, in the case of a two-ply sealing ring.

Accordingly, multi-ply sealing rings have been developed with the ends of the plies welded together along an annular weld zone so that fluid does not enter between the plies. Such multi-ply sealing rings are disclosed in U.S. Pat. No. 5,249,814 to Halling. However, sealing rings such as those disclosed in the Halling patent provide exceptional performance. However, they are often more costly to manufacture.

Other examples of prior sealing rings are disclosed in U.S. Pat. No. 2,263,756 to Bowers; U.S. Pat. No. 3,272,521 to McNenny; U.S. Pat. No. 3,595,588 to Rode; U.S. Pat. No. 4,218,067 to Halling; U.S. Pat. No. 4,361,335 to Vinciguerra; U.S. Pat. No. 4,477,086 to Feder et al; and U.S. Pat. No. 4,759,555 to Halling.

Accordingly, in view of the above, it is apparent that there exists a need for a sealing ring which provides superior performance at lower manufacturing costs, that maintains current standards for leakage control while accommodating greater flange distortion than prior ring seals, and multi-ply seals that eliminate circumferential edge welding requirements between the plies.

This invention addresses these needs in the art, along with other needs, which will become apparent to those skilled in the art once given this disclosure.

SUMMARY OF THE INVENTION

Accordingly, an object of the present invention is to provide a sealing ring having superior performance at lower manufacturing costs.

Another object of the present invention is to provide a sealing ring with lower stress levels.

Another object of the present invention is to provide a multi-ply sealing ring which does not require circumferential edge welding between plies.

Another object of the present invention is to provide a sealing ring having increased deflection capabilities to accommodate the larger circular thermal expansion movements occurring in modern turbine engines without loss of resiliency due to stress relaxation or failure due to fatigue.

The foregoing objects are basically attained by providing a pressure-energized sealing ring, comprising: an annular bight portion having a first substantially smooth surface adapted to be in fluid contact with a first high pressure fluid, and a second surface adapted to be in fluid contact with a second low pressure fluid of a lower pressure than the first fluid; a first annular leg portion extending from one end of the bight portion to a first free end thereof, and having a first substantially smooth surface extending coextensively from the first surface of the bight portion to the first free of the first leg portion, and a second surface extending from the second surface of the bight portion to the first free end of the first leg portion, the first leg portion having a curved section forming a first annular sealing surface on the first surface of the first leg portion with the first free end at the first leg portion being in fluid contact with the second low pressure fluid; and a second annular leg portion extending from the other of the bight portion to a second free end thereof, and having a first substantially smooth surface extending coextensively from said first surface of the bight portion to the second free end of the second leg portion, and a second surface extending from the second surface of the bight portion to the second free end of the second leg portion, the second leg portion having a second curved section forming a second annular sealing surface on the second surface of the second leg portion with the second free end of the second leg portion being in fluid contact with the second low pressure fluid.

The foregoing objects are also basically attained by providing a pressure-energized sealing ring, comprising: an inner annular ply having an inner bight portion, a first inner leg portion extending from one end of the bight portion to a first free end thereof, and a second inner leg portion extending from the inner end of the inner bight portion to a second free end thereof, the first and second inner leg portions having first and second bent sections with first and second annular sealing surfaces, respectively; and an outer annular ply overlying and nested with the inner annular ply, and having an outer bight portion, a first outer leg portion extending from one end of the outer bight portion to a third free end thereof, and a second outer leg portion extending from the other end of the outer bight portion to a fourth free end thereof, the first and second outer leg portions having first and second bent sections in intimate contact with the first and second bent sections of the inner leg portions to securely couple the inner and outer annular plies together, the first, second, third and fourth free ends being positioned between the annular bight portions and the annular sealing surfaces so that the free ends are exposed to a low pressure fluid engaging the outer ply.

In some embodiments, a single ply is utilized, while in other embodiments a multi-ply is utilized. Also, in some embodiments, each of the annular leg portions has a planar section and a curved section, while in other embodiments the planar section has been eliminated.

Also, in accordance with the present invention, the bight portion can either be a single curved section or have multiple convolutions. Moreover, the profile, i.e., the cross-sectional profile, of the sealing rings may be reversed to form an externally pressure-energized seal which prevents high pressure fluid from moving axially inwardly towards the center of the sealing ring.

BRIEF DESCRIPTION OF THE DRAWINGS

Referring now to the drawings which form a part of this original disclosure.

DETAILED DESCRIPTION OF THE DRAWINGS

Figure 1:
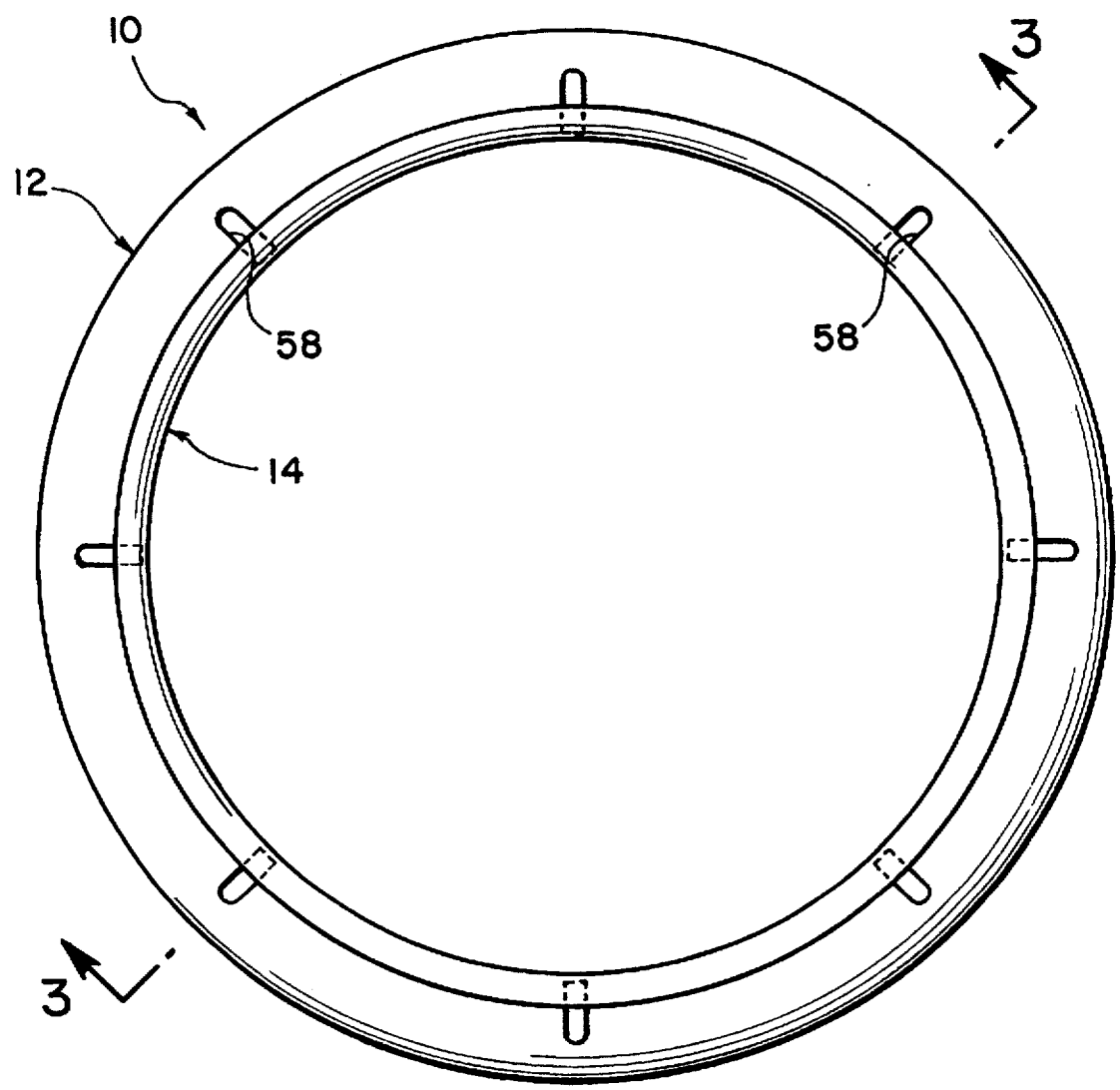
FIG. 1 is a side elevational view of a two-ply sealing ring in accordance with a first embodiment of the present invention.
Figure 2:
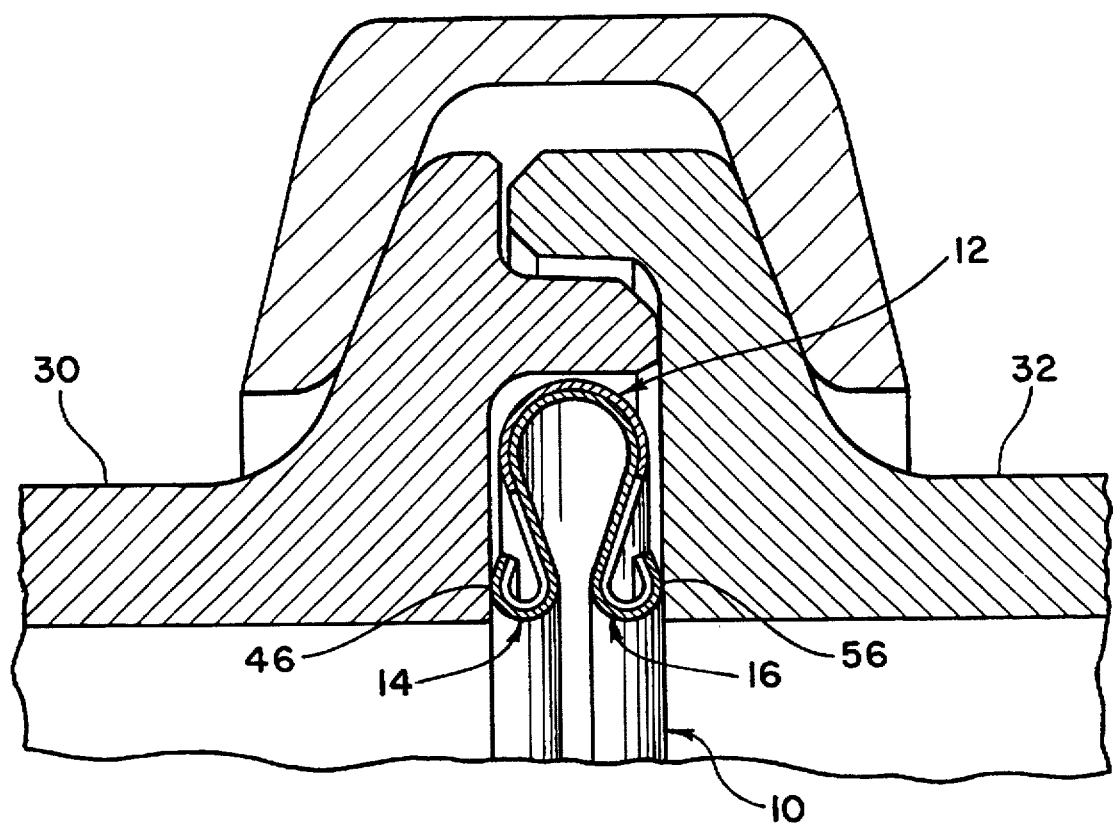
FIG. 2 is an enlarged partial, longitudinal cross-sectional view of the sealing ring illustrated in FIG. 1 installed in a joint between a pair of pipes.
Figure 3:
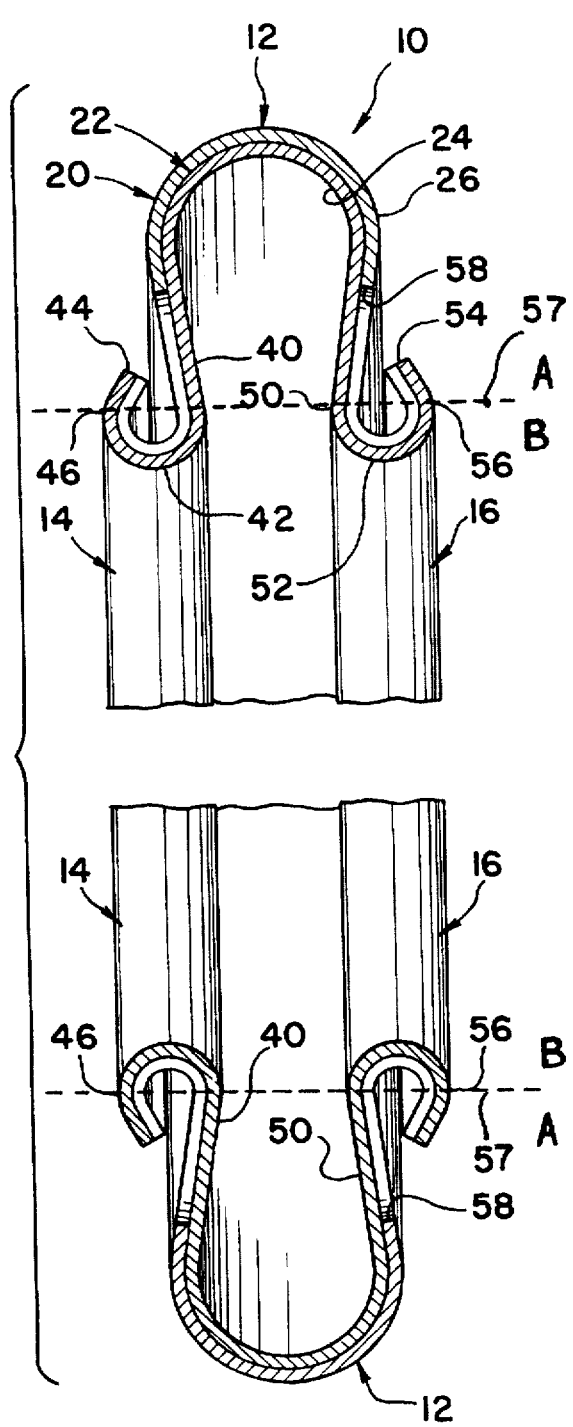
FIG. 3 is an enlarged partial, longitudinal cross-sectional view of the sealing ring illustrated in FIG. 1 taken along section line 3—3.

Referring initially to FIGS. 1–3, an internally pressure-energized sealing ring 10 in accordance with a first embodiment of the present invention is illustrated. Sealing ring 10 includes an annular bight portion 12, a first annular leg portion 14 extending from one end of bight portion 12, and a second annular leg portion 16 extending from the other end of bight portion 12.

In this embodiment, sealing ring 10 is constructed of two plies or annular members 20 and 22 made of a resilient, metallic material. Each ply is preferably approximately 0.005 inch thick. Of course, any suitable thickness from a manufacturing or contact load standpoint can be utilized. The metallic material of plies 20 and 22 can be constructed as any high, temperature resilient material such as an INCONEL, WASPALLOY or any high temperature stainless steel, as well as any newly developed high temperature, resilient material.

First ply 20 is an outer ply which overlies second ply 22 which is an inner ply. Outer ply 20 is nested together with inner ply 22 so that their opposing surfaces are in intimate contact at their interfaces therebetween. Outer ply 20 is in fluid contact with a low pressure fluid. Inner ply 22, on the other hand, is in fluid contact with a high pressure fluid for pressure-energizing sealing ring 10. Inner ply 22 has a first or interior surface 24 which is subjected to the high pressure fluid for pressure-energizing sealing ring 10, while outer ply 20 has a second or exterior surface 26 which is subjected to the low pressure fluid. Thus, sealing ring 10 is an internally pressurized seal i.e., the high pressure fluid being sealed exerts a radially outwardly extending force on sealing ring 10.

Bight portion 12 is shaped as a partial circle when viewed in longitudinal cross-section as seen in FIGS. 2 and 3. Bight portion 12 extends through an arc of at least approximately 180° and preferably in the range of approximately 190° to approximately 220°. For example, the bight portion can extend through an arc of approximately 212.66°. Bight portion 12 is designed so that it does not engage pipe flanges 30 and 32 as seen in FIG. 2. Accordingly, bight portion 12 is free to deflect inwardly to lower any localized stress within bight portion 12. In other words, the stress in bight portion 12 is more uniformly distributed since bight portion 12 does not contact pipe flanges 30 or 32. Moreover, since bight portion 12 is a substantially smooth arc, there is no single bending point with high localized stress as in a V-type sealing ring or in the tight radius bends of some prior seals.

Leg portions 14 and 16 are substantially identical, except that leg portion 14 is a mirror image of leg portion 16. Leg portion 14 includes a substantially straight planar section 40 extending from one end of bight portion 12, and a curved or bent section 42 extending from planar section 40 to a free end 44. Curved section 42 includes a curved sealing surface 46 for contacting pipe flange 30 to form an annular fluid-tight seal therebetween.

Likewise, second leg portion 16 includes a substantially straight planar section 50 extending from one end of bight portion 12, and a curved or bent section 52 extending from planar section 50 to a free end 54. Curved section 52 includes an annular sealing surface 56 for engaging pipe flange 32 to form an annular fluid-tight seal therebetween.

Preferably, planar sections 40 and 50 in their unstressed state converge towards each other slightly as they extend away from bight portion 12 to assist in maintaining plies 20 and 22 together. Of course, in other embodiments of the invention (not illustrated) planar portions 40 and 50 could be formed such that in their unstressed state, planar portions 40 and 50 would be either parallel or diverging depending on the desired application. This would result in bight portion 12 having a curvature of approximately 180° or less that 180°.

Each of planar portions 40 and 50 are located at least partially radially beyond the free ends 44 and 54, respectively, towards bight portion 12 Also, planar portions 40 and 50 can be crowned inwardly as in one of the embodiments disclosed below. The interior surfaces of planar sections 40 and 50 are coextensive with the interior surface of bight portion 12 to form a substantially smooth interior surface. As will be apparent to those skilled in the art from this disclosure, "substantially smooth surface" as used herein is intended to include flat surfaces as well as curved surfaces which are free of any abrupt transitions, i.e., sharp bends, and which appear to be visually smooth. In other words, a "substantially smooth surface" can include surfaces which appear rough under a magnifying instrument.

Curved sections 42 and 52 extend through an arc of at least approximately 180° and preferably slightly larger than 180° so that curved sealing surfaces 46 and 56 fully engage pipe flanges 30 and 32, respectively, to form a pair of annular seals therebetween. Annular sealing line 57 is formed between annular sealing surfaces 46 and 56. Annular sealing line 57 divides first surface 24 of inner ply 22 into a pair of low pressure sections exposed to the low pressure fluid and a high pressure section exposed to the high pressure fluid. As can be readily seen in FIG. 3, the curved section of bight portion 12 is located on a first side A of sealing line 57 together with free ends 44 and 54. The curved or bent sections 42 and 52, on the other hand, are located on a second or opposite side B of sealing line 57. The portion of the high pressure section of first surface 24 lying on the first side A of sealing line 57 is greater in surface area than the portion of the high pressure section lying on the second side B of sealing line 57. The very ends of curved sections 42 and 52 can have a short planar section as seen in the drawings or can continue to be curved to the free ends 44 and 54.

Outer ply 20 adds strength to sealing ring 10, but is not in fluid engagement with the high pressure fluid being constrained by sealing ring 10. Optionally, a plurality of cutouts such as slots 58 can be provided to provide additional flexibility along leg portions 14 and 16. Slots 58 aid in constructing and installing sealing ring 10. Slots 58 are preferably evenly spaced about the circumference of sealing ring 10, and are positioned on both first and second leg portions 14 and 16 along planar sections 40 and 50 and curved sections 42 and 52. For example, in FIG. 1, eight slots 58 are illustrated on each of the leg portions 14 and 16 with only leg portion 14 being shown in FIG. 1.

While in this embodiment, two plies 20 and 22 are illustrated in intimate surface contact at their interfaces therebetween, a layer of auto-damping material may be disposed between the plies. Also, while the illustrated embodiment has only two plies, additional plies may be employed, or the two plies may be substituted for a single ply as discussed below. Moreover, plies 20 and 22 can be the same thickness as shown, or different thicknesses as needed and/or desired.

In addition, plies 20 and 22 can be made of materials having either the same or different characteristics and/or compositions. For example, materials can be selected to provide desired expansion characteristics for a particular sealing application, the individual plies can be made of different materials to provide a sealing ring having greater corrosion resistance on one side and more desirable mechanical properties on the other side.

Also, as will be apparent from the other embodiments disclosed herein, bight portion 12 can be made with multiple convolutions as will be discussed below and can be modified to be an externally pressurized type seal as discussed below. This embodiment can be coated with a layer of a smear plating of a soft metallic material such as nickel, lead, silver or any other suitable material as discussed below in one of the next embodiment.

In a typical jet engine application of a multi-ply sealing ring, such as a pneumatic V-joint for aircraft ducting system, each ply is approximately 0.005 inch thick. However, there is no limit to either diameter of the ring or the thickness of the plies. Thickness will be determined by the operating and test pressures and temperatures. The thickness of each ply and the number of plies will also be determined by the amount of deflection to be experienced in service due to installation tolerances and the thermal excursions of the components and assemblies to be sealed. Moreover, the cross-sectional configuration, including the number of convolutions for convolution type seals, will also be a determining of thickness. A typical single convolution seal, for example, will have an inner diameter of approximately 4.96 inches, and outer diameter of 5.24 inches and two plies with each ply being approximately 0.005 inch thick (±0.001).

The contact force between the components being sealed and sealing ring 10 as well as the stress level within sealing ring 10 can be varied as needed and/or desired by (1) changing the length of planar sections 40 and 50 of leg portions 14 and 16, (2) varying the number of plies, (3) varying the thickness of the plies, and/or (4) varying other geometry of the sealing ring. In other words, by shortening the length of planar sections 40 and 50, the contact force and the stress level within the bight portion will be increased. By increasing the number of plies, but maintaining the same overall thickness, the contact force and the stress level in the bight portion will be decreased as compared with a sealing ring of lower number of plies with the same overall thickness. For example, a single ply of 0.010 inch thickness will have a higher contact force and a higher stress level in the bight portion than a two-ply seal with the same overall thickness wherein each ply of the two-ply seal is about 0.005 inch thick.

Figure 4:
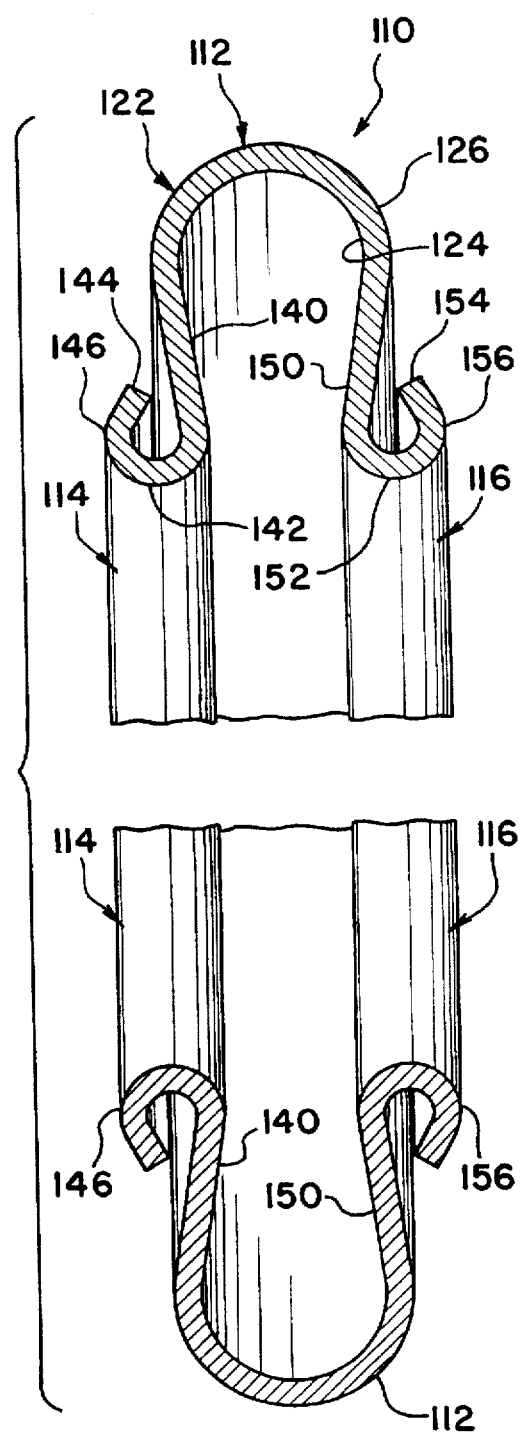
FIG. 4 is a partial longitudinal cross-sectional view of a single ply sealing ring in accordance with a second embodiment of the present invention.

Embodiment of FIG. 4

Referring now to FIG. 4, a sealing ring 110 in accordance with a second embodiment of the present invention is illustrated. Sealing ring 110 is substantially identical to sealing ring 10, except that the outer ply of sealing ring 10 has been eliminated and the thickness of its inner ply 122 has been doubled. Thus, sealing ring 110 is a single ply seal having the same thickness as sealing ring 10 of FIGS. 1–3. Since this embodiment is substantially identical to the first embodiment of FIGS. 1–3, this embodiment will not be discussed or illustrated in detail herein.

Sealing ring 110 is an internally pressure-energized sealing ring, and includes an annular bight portion 112, a first annular leg portion 114 extending from one end of bight portion 112, and a second annular leg portion 116 extending from the other end of bight portion 112.

In this embodiment, sealing ring 110 is constructed of a single ply 122 made of a resilient, metallic material which is preferably approximately 0.010 inch thick. Of course, any suitable thickness from a manufacturing or contact load standpoint can be utilized. The metallic material of ply 122 can be constructed as any high, temperature resilient material such as an INCONEL, WASPALLOY or any high temperature stainless steel, as well as any newly developed high temperature, resilient material.

Ply 122 has a first or interior surface 124 which is subjected to the high pressure fluid for pressure-energizing sealing ring 110, and a second or exterior surface 126 which is subjected to the low pressure fluid. Thus, sealing ring 110 is an internally pressurized seal, i.e., the high pressure fluid being sealed exerts a radially outwardly extending force on sealing ring 110.

Bight portion 112 is shaped as a partial circle when viewed in longitudinal cross-section as seen in FIG. 4. Bight portion 112 extends through an arc of at least approximately 180° and preferably in the range of approximately 190° to approximately 220°. For example, the bight portion can extend through an arc of approximately 212.66°. Bight portion 112 is designed so that it does not engage the components being sealed. Accordingly, bight portion 112 is free to deflect inwardly to lower any localized stress within bight portion 112. In other words, the stress in bight portion 112 is more uniformly distributed since bight portion 112 does not contact the components being sealed. Moreover, since bight portion 112 is a substantially smooth arc, there is no single bending point with high localized stress.

Leg portions 114 and 116 are substantially identical, except that leg portion 114 is a mirror image of leg portion 116. Leg portion 114 includes a substantially straight planar section 140 extending from one end of bight portion 112, and a curved section 142 extending from planar section 140 to a free end 144. Curved section 142 includes a curved sealing surface 146 for contacting one of the components (not shown) being sealed to form an annular fluid-tight seal therebetween.

Likewise, second leg portion 116 includes a substantially straight planar section 150 extending from one end of bight portion 112, and a curved section 152 extending from planar section 150 to a free end 154. Curved section 152 includes an annular sealing surface 156 for engaging the other of the components (not shown) being sealed to form an therebetweend-tight seal therebetween.

Preferably, planar sections 140 and 150 in their unstressed state converge towards each other slightly as they extend away from bight portion 112. Of course, in other embodiments of the invention (not illustrated) planar portions 140 and 150 could be formed such that in their unstressed state, planar portions 140 and 150 would be either parallel or diverging depending on the desired application. This would result in bight portion 112 having a curvature of approximately 180° or less than 180°. Also, planar portions 140 and 150 can be crowned inwardly as in one of the embodiments disclosed below. The interior surfaces of planar sections 140 and 150 are coextensive with the interior surface of bight portion 112 to form a substantially smooth interior surface.

Curved sections 142 and 152 extend through an arc of approximately 180° and preferably slightly larger than 180° so that curved sealing surfaces 146 and 156 fully engage the components (not shown) being sealed to form a pair of annular seals therebetween. The very ends of curved sections 142 and 152 can have a short planar section as seen in the drawings or can continue to be curved to the free ends 144 and 154.

In this embodiment, sealing ring 110 is preferably coated with a layer of a smearable plating (not shown) of a soft metallic material such as nickel, lead, silver or any other suitable material. The smearable plating is preferably applied over the entire surface of sealing ring 110 by bath plating. However, the smearable plating can be applied just to annular sealing surfaces 146 and 156. The smearable plating is designed to deform or flow into any imperfections in the components (e.g. the pipe flanges or sealing gland surfaces) being sealed, when the sealing ring 110 is properly installed.

Figure 5:
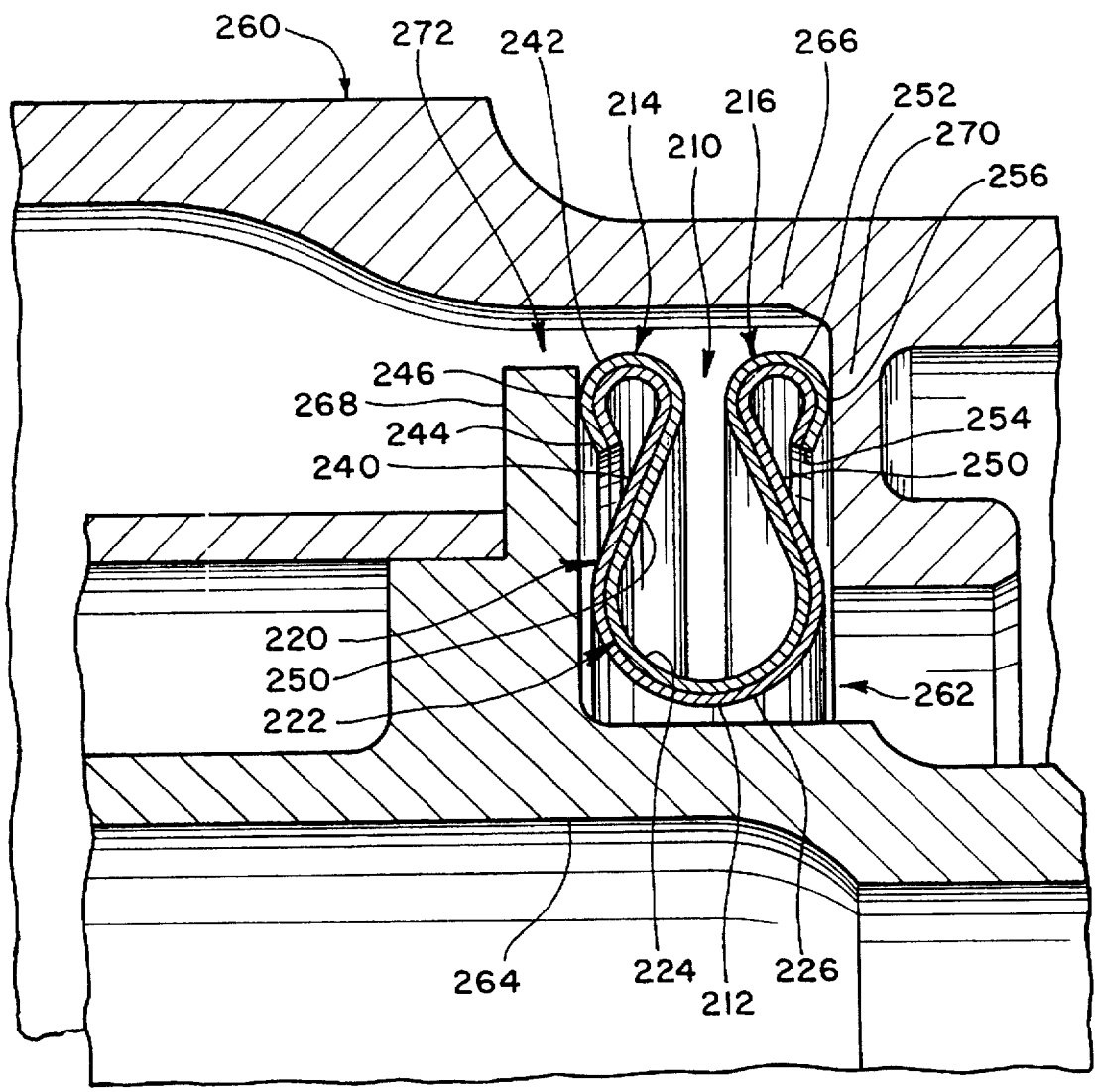
FIG. 5 is a partial longitudinal cross-sectional view of a modified two-ply sealing ring in accordance with a third embodiment of the present invention installed in an engine casing.

Embodiment of FIG. 5

In FIG. 5, a modified two-ply sealing ring 210 in accordance with a third embodiment of the present invention is illustrated installed in an engine casing 260. Sealing ring 210 is substantially identical to sealing ring 10, except that sealing ring 210 has been reversed so as to be an externally pressurized-type, rather than an internally pressurized-type. Thus, the inner ply 222 faces radially outwardly instead of radially inwardly. Since this sealing ring 210 is similar to sealing ring 10, sealing ring 210 will not be discussed or illustrated herein in detail.

Sealing ring 210 includes an annular bight portion 212, a first annular leg portion 214 extending from one end of bight portion 212, and a second annular leg portion 216 extending from the other end of bight portion 212. Sealing ring 210 is illustrated in a cavity 262 of engine casing 260, which is defined between inner housing 264 and outer housing 266. First leg portion 214 engages flange 268 of inner housing 264 and leg portion 216 engages flange 270 of outer housing 266 to form a seal therebetween. A high pressure fluid is located in a channel 272 which exerts a high pressure force on the outside portion of sealing ring 210.

Sealing ring 210 is constructed of two plies or annular members 220 and 222 made of a resilient, metallic material. Each ply is preferably approximately 0.005 inch thick. Of course, any suitable thickness from a manufacturing or contact load standpoint can be utilized. The metallic material of plies 220 and 222 can be constructed as any high, temperature resilient material such as an INCONEL, WASPALLOY or any high temperature stainless steel, as well as any newly developed high temperature, resilient material.

First ply 220 is an outer ply which overlies second ply 222 which is an inner ply. Outer ply 220 is nested together with inner ply 222 so that their opposing surfaces are in intimate contact at their interfaces therebetween. Outer ply 220 is in fluid contact with a low pressure fluid. Inner ply 222, on the other hand, is in fluid contact with a high pressure fluid for pressure-energizing sealing ring 220. Inner ply 222 has a first or interior surface 224 which is subjected to the high pressure fluid for pressure-energizing sealing ring 210, while outer ply 220 has a second or exterior surface 226 which is subjected to the low pressure fluid. Thus, sealing ring 210 is an internally pressurized seal, i.e., the high pressure fluid being sealed exerts a radially outwardly extending force on sealing ring 210.

Bight portion 212 is shaped as a partial circle when viewed in longitudinal cross-section as seen in FIG. 5. Bight portion 212 extends through an arc of at least approximately 180° and preferably in the range of approximately 190° to approximately 220°. For example, the bight portion can extend through an arc of approximately 212.66°. Bight portion 212 is designed so that it does not engage flanges 268 and 270 as seen in FIG. 5. Accordingly, bight portion 212 is free to deflect inwardly to lower any localized stress within bight portion 212. In other words, the stress in bight portion 212 is more uniformly distributed since bight portion 212 does not contact pipe flanges 230 or 232. Moreover, since bight portion 212 is a substantially smooth arc, there is no single bending point with high localized stress.

Leg portions 214 and 216 are substantially identical, except that leg portion 214 is a mirror image of leg portion 216. Leg portion 214 includes a substantially straight planar section 240 extending from one end of bight portion 212, and a curved section 242 extending from planar section 240 to a free end 244. Curved section 242 includes a curved sealing surface 246 for contacting flange 268 to form an annular fluid-tight seal therebetween.

Likewise, second leg portion 216 includes a substantially straight planar section 250 extending from one end of bight portion 212, and a curved section 252 extending from planar section 250 to a free end 254. Curved section 252 includes an annular sealing surface 256 for engaging flange 270 to form an annular fluid-tight seal therebetween.

Preferably, planar sections 240 and 250 in their unstressed state converge slightly towards each other as they extend away from bight portion 212 to assist in maintaining plies 220 and 222 together. Of course, in other embodiments of the invention (not illustrated) planar portions 240 and 250 could be formed such that in their unstressed state, planar portions 240 and 250 would be either parallel or diverging depending on the desired application. This would result in bight portion 212 having a curvature of approximately 180° or less that 180°. Also, planar portions 240 and 250 can be crowned inwardly as in one of the embodiments disclosed below. The interior surfaces of planar sections 240 and 250 are coextensive with the interior surface of bight portion 212 to form a substantially smooth interior surface.

Curved sections 242 and 252 extend through an arc of at least approximately 180° and preferably slightly larger than 180° so that curved sealing surfaces 246 and 256 fully engage flanges 268 and 270, respectively, to form a pair of annular seals therebetween. The very ends of curved sections 242 and 252 can have a short planar section as seen in the drawings or can continue to be curved to the free ends 244 and 254.

Outer ply 220 adds strength to sealing ring 210, but is not in fluid engagement with the high pressure fluid being constrained by sealing ring 210. Since sealing ring 210 is illustrated as being used in an engine casing sealing ring 210 is a large diameter sealing ring which does not usually need cutouts or slots in the portions of outer ply 220. However, a plurality of cutouts such as slots (not shown) can be provided to provide additional flexibility along leg portions 214 and 216, if needed.

While in this embodiment, two plies 220 and 222 are illustrated in intimate surface contact at their interfaces therebetween, a layer of auto-damping material may be disposed between the plies. Also, while the illustrated embodiment has only two plies, additional plies may be employed, or the two plies may be substituted for a single ply as discussed herein. Moreover, plies 220 and 222 can be the same thickness as shown, or different thicknesses as needed and/or desired. In addition, plies 220 and 222 can be made of materials having either the same or different characteristics and/or compositions. For example, materials may be selected to provide desired expansion characteristics for a particular sealing application, the individual plies may be made of different materials to provide a sealing ring having greater corrosion resistance on one side and more desirable mechanical properties on the other side.

Also, as will be apparent from the other embodiments disclosed herein, bight portion 212 may be made of multiple convolutions as will be discussed below. This embodiment can be coated with a smearable plating of a soft metallic material such as nickel, lead, silver or any other suitable material, if needed. Although in this embodiment and most other multi-ply versions of the invention, the sealing ring would either be bare or a hard wear resistant coating such as TRIBALOY® would be applied thereto in a conventional manner such as by a spraying process.

The contact force between the components being sealed and sealing ring 210 as well as the stress level within sealing ring 210 can be varied as needed and/or desired by (1) changing the length of planar sections 240 and 250 of leg portions 214 and 216, (2) varying the number of plies, (3) varying the thickness of the plies, and/or (4) varying other geometry of the sealing ring. In other words, by shortening the length of planar sections 240 and 250, the contact force and the stress within the bight portion will be increased. By increasing the number of plies, but maintaining the same overall thickness, the contact force and the stress level in the bight portion will be decreased as compared with a sealing ring of lower number of plies with the same overall thickness.

Figure 6:
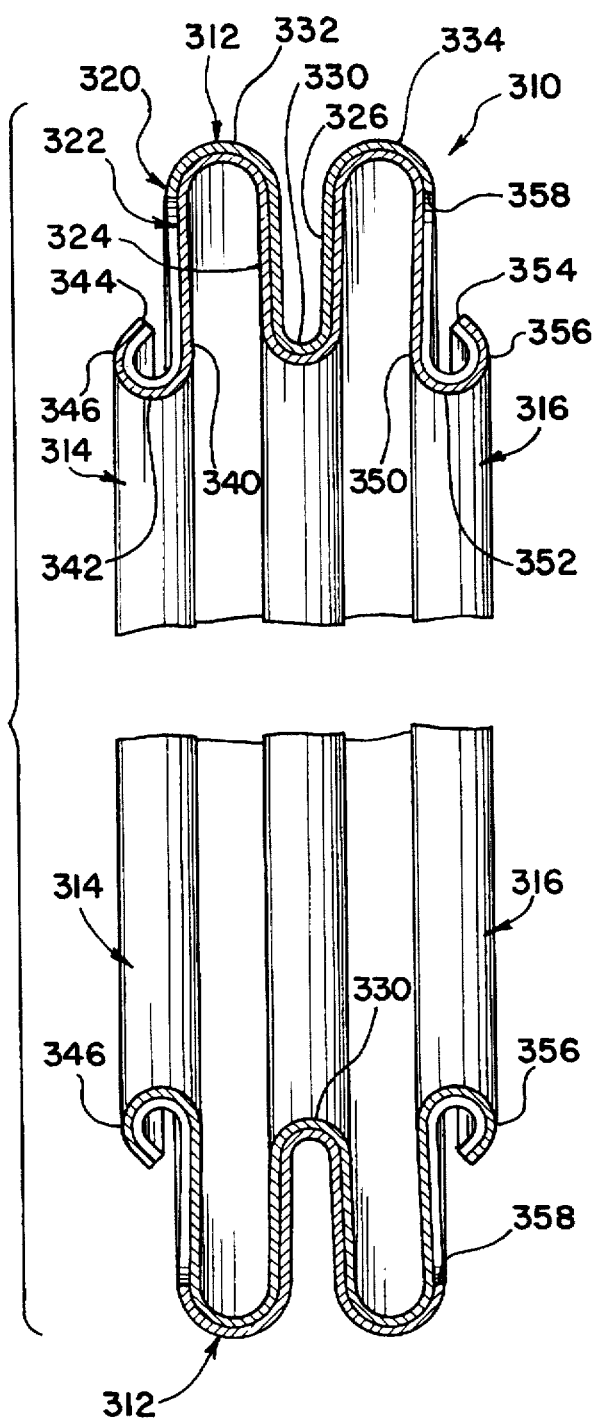
FIG. 6 is a partial longitudinal cross-sectional view of a two-ply, convolution type sealing ring in accordance with a fourth embodiment of the present invention.

Embodiment of FIG. 6

Referring now to FIG. 6, a two-ply convolution type sealing ring 310 in accordance with a fourth embodiment of the present invention is illustrated. Sealing ring 310 is substantially identical to sealing ring 10, except that bight portion 12 of sealing 10 has been modified so that bight portion 312 of sealing 310 has a convolution. Thus, sealing ring 310 will not be discussed or illustrated in detail herein.

Sealing ring 310 is an internally pressure-energized sealing ring, and includes an annular bight portion 312, a first annular leg portion 314 extending from one end of bight portion 312, and a second annular leg portion 316 extending from the other end of bight portion 312.

In this embodiment, sealing ring 310 is constructed of two plies or annular members 320 and 322 made of a resilient, metallic material. Each ply is preferably approximately 0.005 inch thick. Of course, any suitable thickness from a manufacturing or contact load standpoint can be utilized. The metallic material of plies 320 and 322 can be constructed as any high, temperature resilient material such as an INCONEL, WASPALLOY or any high temperature stainless steel, as well as any newly developed high temperature, resilient material.

First ply 320 is an outer ply which overlies second ply 322 which is an inner ply. Outer ply 320 is nested together with inner ply 322 so that their opposing surfaces are in intimate contact at their interfaces therebetween. Outer ply 320 is in fluid contact with a low pressure fluid. Inner ply 322, on the other hand, is in fluid contact with a high pressure fluid for pressure-energizing sealing ring 310. Inner ply 322 has a first or interior surface 324 which is subjected to the high pressure fluid for pressure-energizing sealing ring 310, while outer ply 320 has a second or exterior surface 326 which is subjected to the low pressure fluid. Thus, sealing ring 310 is an internally pressurized seal, i.e., the high pressure fluid being sealed exerts a radially outwardly extending force on sealing ring 310.

Bight portion 312 includes a convolution 330 interconnected through first and second bends or curved sections 332 and 334 to leg portions 314 and 316, respectively. While convolution 330 is illustrated as having its legs substantially parallel, it will be apparent to those skilled in the art that the legs of convolution 330 can be converging as they approach curved seconds 332 and 334. Accordingly, sealing ring 310 has an E-shaped profile when viewed in longitudinal cross-section. It will be apparent to those skilled in the art that bight portion 312 can have multiple convolutions similar to the sealing ring disclosed in U.S. Pat. No. 5,249,814 to Halling, which is hereby incorporated herein by reference.

Bight portion 312 is designed so that it does not engage the components being sealed. Accordingly, bight portion 312 is free to deflect inwardly to lower any localized stress within bight portion 312. In other words, the stress in bight portion 312 is more uniformly distributed since bight portion 312 does not contact the components being sealed. Moreover, since bight portion 312 has substantially smooth curves, there is no single point of bending with high localized stress.

Leg portions 314 and 316 are substantially identical, except that leg portion 314 is a mirror image of leg portion 316. Leg portion 314 includes a substantially straight planar section 340 extending from one end of bight portion 312, and a curved section 342 extending from planar section 340 to a free end 344. Curved section 342 includes a curved sealing surface 346 for engaging one of the components (not shown) being sealed to form an annular fluid-tight seal therebetween.

Likewise, second leg portion 316 includes a substantially straight planar section 350 extending from one end of bight portion 312, and a curved section 352 extending from planar section 350 to a free end 354. Curved section 352 includes an annular sealing surface 356 for engaging the other of the components (not shown) being sealed to form an annular fluid-tight seal therebetween.

Preferably, planar sections 340 and 350 in their unstressed state converge slightly towards each other as they extend away from bight portion 312 to assist in maintaining the two plies 320 and 322 together. Of course, in other embodiments of the invention (not illustrated) planar portions 340 and 350 could be formed such that in their unstressed state, planar portions 340 and 350 would be either parallel or diverging depending on the desired application. This would result in bight portion 312 having a curvature of approximately 180° or less that 180°. Also, planar portions 340 and 350 can be crowned inwardly as in one of the embodiments disclosed below. The interior surfaces of planar sections 340 and 350 are coextensive with the interior surface of bight portion 312 to form a substantially smooth interior surface.

Curved sections 342 and 352 extend through an arc of at least approximately 180° and preferably slightly larger than 180° so that curved sealing surfaces 346 and 356 fully engage the components (not shown) being sealed to form a pair of annular seals therebetween. The very ends of curved sections 342 and 352 can have a short planar section as seen in the drawings or can continue to be curved to the free ends 344 and 354.

Outer ply 320 adds strength to sealing ring 310, but is not in fluid engagement with the high pressure fluid being constrained by sealing ring 310. Optionally, a plurality of cutouts such as slots 358 can be provided to provide additional flexibility along leg portions 314 and 316. Slots 358 aid in constructing and installing sealing ring 310. Slots 358 are preferably evenly spaced about the circumference of sealing ring 310, and are positioned on both first and second leg portions 314 and 316 along planar sections 340 and 350 and curved sections 332 and 352. For example, in FIG. 1, eight slots 358 are illustrated on each of the leg portions 314 and 316 with only leg portion 314 being shown in FIG. 1.

While in this embodiment, two plies 320 and 322 are illustrated in intimate surface contact at their interfaces therebetween, a layer of auto-damping material may be disposed between the plies. Also, while the illustrated embodiment has only two plies, additional plies may be employed, or the two plies may be substituted for a single ply as discussed below. Moreover, plies 320 and 322 can be the same thickness as shown, or different thicknesses as needed and/or desired.

In addition, plies 320 and 322 can be made of materials having either the same or different characteristics and/or compositions. For example, materials may be selected to provide desired expansion characteristics for a particular sealing application, the individual plies may be made of different materials to provide a sealing ring having greater corrosion resistance on one side and more desirable mechanical properties on the other side.

Also, as will be apparent from the other embodiments disclosed herein, bight portion 312 can be modified to be an externally pressurized type seal as discussed below. This embodiment can be coated with a smearable plating of a soft metallic material such as nickel, lead, silver or any other suitable material. Although in this embodiment and most multi-ply versions of the invention, the sealing surfaces of the sealing ring would either be bare or a hard wear resistant coating such as TRIBALOY® would be applied thereto in a conventional manner such as by a spraying process.

Figure 7:
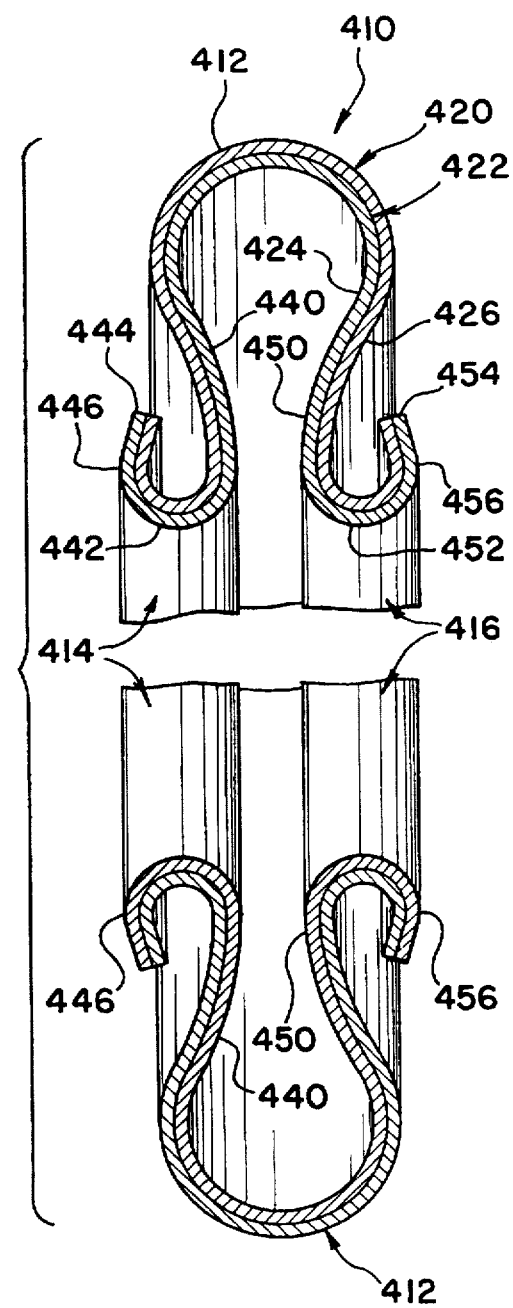
FIG. 7 is a partial longitudinal cross-sectional view of a two-ply sealing ring with the crowned leg portions in accordance with a fifth embodiment of the present invention.

Embodiment of FIG. 7

Referring now to FIG. 7, a two-ply sealing ring 410 is illustrated in accordance with a fifth embodiment of the present invention. Sealing ring 410 is substantially identical to sealing ring 10, except that planar sections 40 and 50 of sealing ring 10 have been modified to be crowned. Thus, sealing ring 410 will not be discussed or illustrated in detail herein.

Sealing ring 410 is an internally pressure-energized sealing ring, and includes an annular bight portion 412, a first annular leg portion 414 extending from one end of bight portion 412, and a second annular leg portion 416 extending from the other end of bight portion 412.

Sealing ring 410 is constructed of two plies or annular members 420 and 422 made of a resilient, metallic material. Each ply is preferably approximately 0.005 inch thick. Of course, any suitable thickness from a manufacturing or contact load standpoint can be utilized. The metallic material of plies 420 and 422 can be constructed as any high, temperature resilient material such as an INCONEL, WASPALLOY or any high temperature stainless steel, as well as any newly developed high temperature, resilient material.

First ply 420 is an outer ply which overlies second ply 422 which is an inner ply. Outer ply 420 is nested together with inner ply 422 so that their opposing surfaces are in intimate contact at their interfaces therebetween. Outer ply 420 is in fluid contact with a low pressure fluid. Inner ply 422, on the other hand, is in fluid contact with a high pressure fluid for pressure-energizing sealing ring 410. Inner ply 422 has a first or interior surface 424 which is subjected to the high pressure fluid for pressure-energizing sealing ring 410, while outer ply 420 has a second or exterior surface 426 which is subjected to the low pressure fluid. Thus, sealing ring 410 is an internally pressurized seal, i.e., the high pressure fluid being sealed exerts a radially outwardly extending force on sealing ring 410.

Bight portion 412 is shaped as a partial circle when viewed in longitudinal cross-section and extends through an arc of at least approximately 180° and preferably in the range of approximately 190° to approximately 220°. For example, the bight portion can extend through an arc of approximately 212.66°. Bight portion 412 is designed so that it does not engage the components being sealed when installed. Accordingly, bight portion 412 is free to deflect inwardly to lower any localized stress within bight portion 412. In other words, the stress in bight portion 412 is more uniformly distributed since bight portion 412 does not contact the components being sealed. Moreover, since bight portion 412 is a substantially smooth arc, there is no single bending point with high localized stress.

Leg portions 414 and 416 are substantially identical, except that leg portion 414 is a mirror image of leg portion 416. Leg portion 414 includes a first inwardly curved section 440 extending substantially tangentially from one end of bight portion 412, and a second outwardly curved section 442 extending substantially tangentially from first curved section 440 to a free end 444. Thus, the transitions between bight portion 412 and first curved section 440 and between first curved section 440 and second curved section 442 are preferably substantially smooth, i.e., without any flat sections therebetween as manufacturing capabilities allow. Second curved section 442 includes a curved sealing surface 446 for engaging one of the components being sealed to form an annular fluid-tight seal therebetween.

Likewise, second leg portion 416 includes a first inwardly curved section 450 extending substantially tangentially from one end of bight portion 412, and a second outwardly curved section 452 extending substantially tangentially from first curved section 450 to a free end 454. Thus, the transitions between bight portion 412 and first curved section 450 and between first curved section 450 and second curved section 452 are preferably substantially smooth and continuously curved, i.e., without any flat sections therebetween as manufacturing capabilities allow. Second curved section 452 includes an annular sealing surface 456 for engaging the other component being sealed to form an annular fluid-tight seal therebetween.

Preferably, first curved sections 440 and 450 in their unstressed state converge slightly towards each other slightly as they extend away from bight portion 412. The interior surfaces of curved sections 440 and 450 are coextensive with the interior surface of bight portion 412 to form a substantially smooth interior surface.

Second curved sections 442 and 452 extend through an arc of approximately 180° and preferably slightly larger than 180° so that curved sealing surfaces 446 and 456 fully engage the components to form a pair of annular seals therebetween. The very ends of curved sections 442 and 452 can have a short planar section as seen in the drawings or can continue to be curved to the free ends 444 and 454.

Outer ply 420 adds strength to sealing ring 410, but is not in fluid engagement with the high pressure fluid being constrained by sealing ring 10. Optionally, a plurality of cutouts such as slots (not shown) can be provided to provide additional flexibility along leg portions 414 and 416.

While in this embodiment, two plies 420 and 422 are illustrated in intimate surface contact at their interfaces therebetween, a layer of auto-damping material may be disposed between the plies. Also, while the illustrated embodiment has only two plies, additional plies may be employed, or the two plies may be substituted for a single ply as discussed herein. Moreover, plies 420 and 422 can be the same thickness as shown, or different thicknesses as needed and/or desired.

In addition, plies 420 and 422 can be made of materials having either the same or different characteristics and/or compositions. For example, materials can be selected to provide desired expansion characteristics for a particular sealing application, the individual plies can be made of different materials to provide a sealing ring having greater corrosion resistance on one side and more desirable mechanical properties on the other side.

Figure 8:
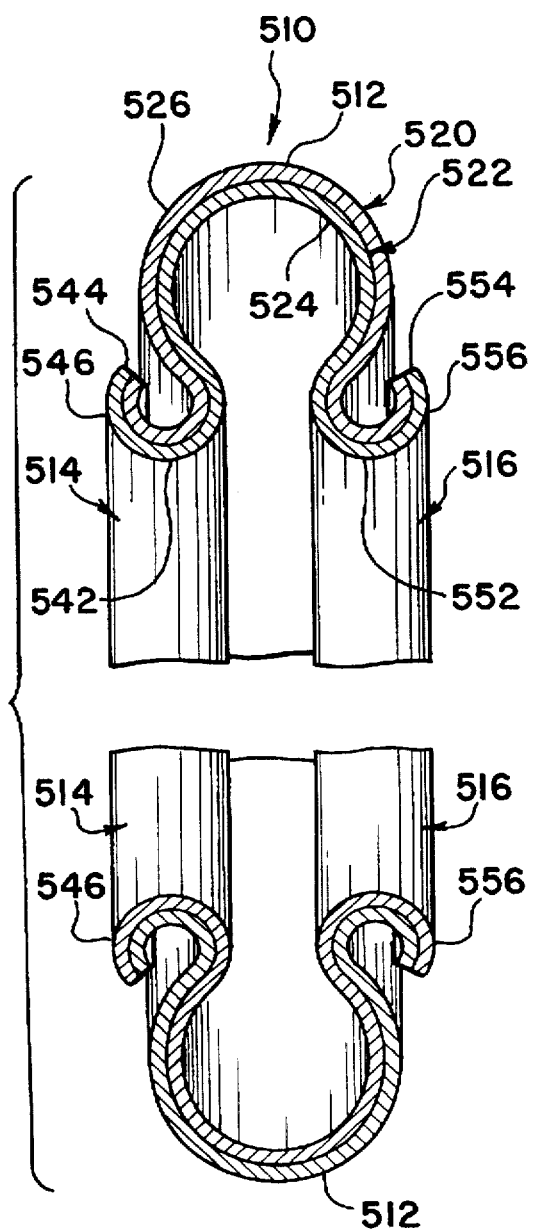
FIG. 8 is a partial longitudinal cross-sectional view of a two-ply sealing ring in accordance with a sixth embodiment of the present invention.

Embodiment of FIG. 8

Referring now to FIG. 8, a two-ply sealing ring 510 is illustrated in accordance with a sixth embodiment of the present invention. This embodiment is substantially identical to sealing ring 10 except that planar sections 40 and 50 of the sealing ring 10 has been eliminated in sealing ring 510. Thus, sealing ring 510 will not be discussed or illustrated in detail herein.

Sealing ring 510 is an internally pressure-energized sealing ring, and includes an annular bight portion 512, a first annular leg portion 514 extending from one end of bight portion 512, and a second annular leg portion 516 extending from the other end of bight portion 512.

Sealing ring 510 is constructed of two plies or annular members 520 and 522 made of a resilient, metallic material. Each ply is preferably approximately 0.005 inch thick. Of course, any suitable thickness from a manufacturing or contact load standpoint can be utilized. The metallic material of plies 520 and 522 can be constructed as any high, temperature resilient material such as an INCONEL, WASPALLOY or any high temperature stainless steel, as well as any newly developed high temperature, resilient material.

First ply 520 is an outer ply which overlies second ply 522 which is an inner ply. Outer ply 520 is nested together with inner ply 522 so that their opposing surfaces are in intimate contact at their interfaces therebetween. Outer ply 520 is in fluid contact with a low pressure fluid. Inner ply 522, on the other hand, is in fluid contact with a high pressure fluid for pressure-energizing sealing ring 510. Inner ply 522 has a first or interior surface 524 which is subjected to the high pressure fluid for pressure-energizing sealing ring 510, while outer ply 520 has a second or exterior surface 526 which is subjected to the low pressure fluid. Thus, sealing ring 510 is an internally pressurized seal, i.e., the high pressure fluid being sealed exerts a radially outwardly extending force on sealing ring 510.

Bight portion 512 is shaped as a partial circle when viewed in longitudinal cross-section as seen in FIG. 8. Bight portion 512 extends through an arc of approximately 180° and preferably in the range of approximately 190° to approximately 220°. For example, the bight portion can extend through an arc of approximately 212.66°. Bight portion 512 is designed so that it does not engage the components (not shown) being sealed. Accordingly, bight portion 512 is free to deflect inwardly to lower any localized stress within bight portion 512. In other words, the stress in bight portion 512 is more uniformly distributed since bight portion 512 does not contact the components being sealed. Moreover, since bight portion 512 is a substantially smooth arc, there is no single bending point with high localized stress.

Leg portions 514 and 516 are substantially identical, except that leg portion 514 is a mirror image of leg portion 516. Leg portion 514 includes a curved section 542 extending substantially tangentially from bight portion 512 to a free end 544. Curved section 542 includes a curved sealing surface 546 for contacting one of the components being sealed to form ah annular fluid-tight seal therebetween. Likewise, second leg portion 516 includes a curved section 552 extending substantially tangentially from bight portion 512 to a free end 554. Curved section 552 includes an annular sealing surface 556 for contacting one of the components being sealed to form an annular fluid-tight seal therebetween.

Curved sections 542 and 552 extend through an arc of approximately 180° and preferably slightly larger than 180° so that curved sealing surfaces 546 and 556 fully engage the components being sealed to form a pair of annular seals therebetween. The very ends of curved sections 542 and 552 can have a short planar section as seen in the drawings or can continue to be curved to the free ends 544 and 554.

Outer ply 520 adds strength to sealing ring 510, but is not in fluid engagement with the high pressure fluid being constrained by sealing ring 510. Optionally, a plurality of cutouts such as slots (not shown) can be provided to provide additional flexibility along leg portions 514 and 516 as needed.

While in this embodiment, two plies 520 and 522 are illustrated in intimate surface contact at their interfaces therebetween, a layer of auto-damping material may be disposed between the plies. Also, while the illustrated embodiment has only two plies, additional plies may be employed, or the two plies may be substituted for a single ply as discussed herein. Moreover, plies 520 and 522 can be the same thickness as shown, or different thicknesses as needed and/or desired.

In addition, plies 520 and 522 can be made of materials having either the same or different characteristics and/or compositions. For example, materials can be selected to provide desired expansion characteristics for a particular sealing application, the individual plies can be made of different materials to provide a sealing ring having greater corrosion resistance on one side and more desirable mechanical properties on the other side.

Also, as will be apparent from the other embodiments disclosed herein, bight portion 512 can be made with multiple convolutions as will be discussed below and can be modified to be an externally pressurized type seal as discussed above. This embodiment can be coated with a hard wear resistant coating such as TRIBALOY®.

Figure 9:
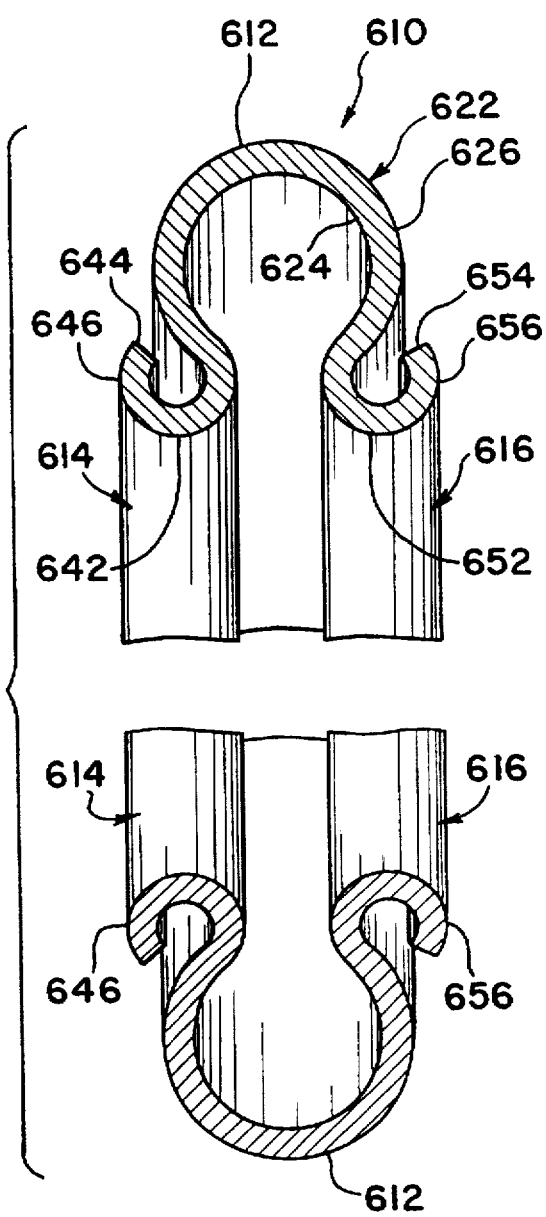
FIG. 9 is a partial longitudinal cross-sectional view of a single ply sealing ring in accordance with a seventh embodiment of the present invention.

Embodiment of FIG. 9

Referring to FIG. 9, a single ply sealing ring 610 in accordance with a seventh embodiment of the present is illustrated. Sealing ring 610 is substantially identical to sealing ring 510, except that a single ply is utilized instead of a double ply. Thus, sealing ring 610 will not be discussed or illustrated in detail herein.

Sealing ring 610 is an internally pressure-energized sealing ring, and includes an annular bight portion 612, a first annular leg portion 614 extending from one end of bight portion 612, and a second annular leg portion 616 extending from the other end of bight portion 612.

Sealing ring 610 is constructed of a single ply 622 made of a resilient, metallic material. Ply is preferably approximately 0.010 inch thick. Of course, any suitable thickness from a manufacturing or contact load standpoint can be utilized. The metallic material of ply 622 can be constructed as any high, temperature resilient material such as an INCONEL, WASPALLOY or any high temperature stainless steel, as well as any newly developed high temperature, resilient material.

Ply 622 has a first or interior surface 624 which is subjected to the high pressure fluid for pressure-energizing sealing ring 610, and a second or exterior surface 626 which is subjected to the low pressure fluid. Thus, sealing ring 610 is an internally pressurized seal, i.e., the high pressure fluid being sealed exerts a radially outwardly extending force on sealing ring 610.

Bight portion 612 is shaped as a partial circle when viewed in longitudinal cross-section as seen in FIG. 9. Bight portion 612 extends through an arc of approximately 180° and preferably in the range of approximately 190° to approximately 220°. For example, the bight portion can extend through an arc of approximately 212.66°. Bight portion 612 is designed so that it does not engage the components (not shown) being sealed. Accordingly, bight portion 612 is free to deflect inwardly to lower any localized stress within bight portion 612. In other words, the stress in bight portion 612 is more uniformly distributed since bight portion 612 does not contact the components being sealed. Moreover, since bight portion 612 is a substantially smooth arc, there is no single bending point with high localized stress.

Leg portions 614 and 616 are substantially identical, except that leg portion 614 is a mirror image of leg portion 616. Leg portion 614 includes a curved section 642 extending substantially tangentially from bight portion 612 to a free end 644. Curved section 642 includes a curved sealing surface 646 for contacting one of the components being sealed to form an annular fluid-tight seal therebetween. Likewise, second leg portion 616 includes a curved section 652 extending substantially tangentially from bight portion 612 to a free end 654. Curved section 652 includes an annular sealing surface 656 for engaging one of the components being sealed to form an annular fluid-tight seal therebetween.

Curved sections 642 and 652 extend through an arc of at least approximately 180° and preferably slightly larger than 180° so that curved sealing surfaces 646 and 656 fully engage the components being sealed to form a pair of annular seals therebetween. The very ends of curved sections 642 and 652 can have a short planar section as seen in the drawings or can continue to be curved to the free ends 644 and 654.

In this embodiment sealing ring 610 is preferably coated with a layer of a smearable plating (not shown) of a soft metallic material such as nickel, lead, silver or any other suitable material. The smearable plating is preferably applied over the entire surface of sealing ring 610 by bath plating. However, the smearable plating can be applied just to annular sealing surfaces 646 and 656. The smearable plating is designed to deform or flow into any imperfections in the components (e.g. the pipe flanges) being sealed, when the sealing ring 610 is properly installed.

Figure 10:
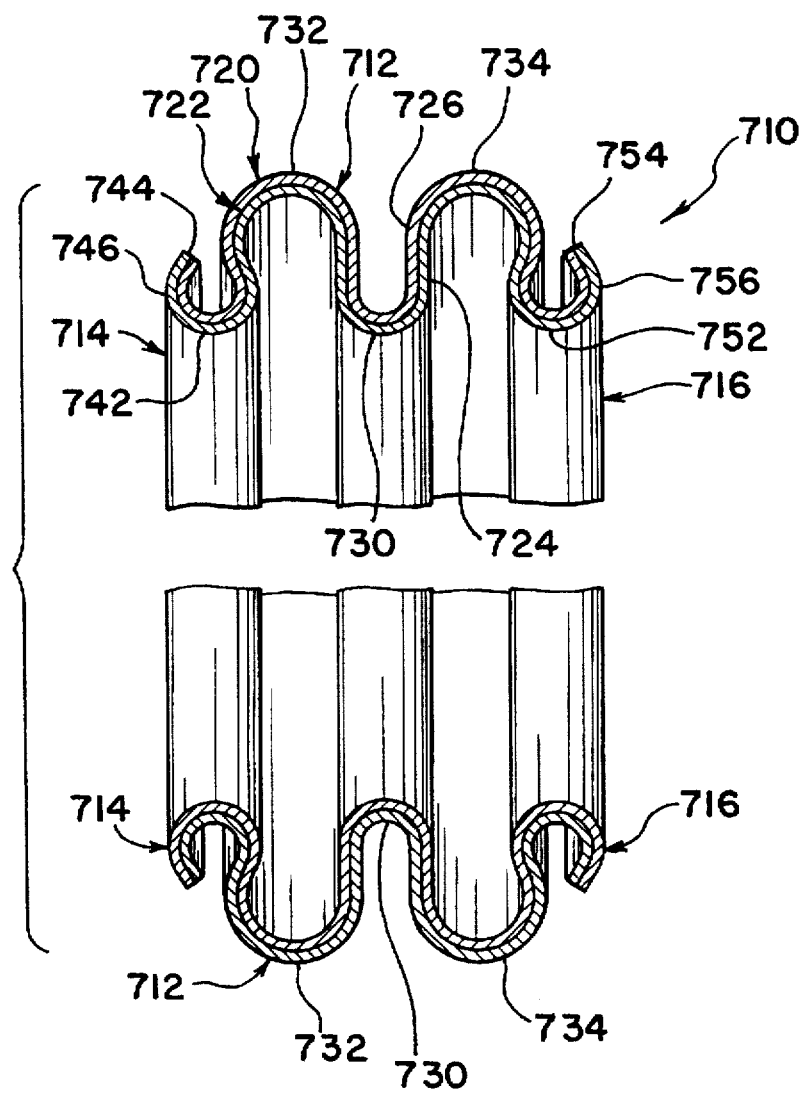
FIG. 10 is a partial longitudinal cross-sectional view of a two-ply, convolutions type sealing ring-in accordance with an eighth embodiment of the present invention.

Embodiment of FIG. 10

Referring now to FIG. 10, a two-ply convolution type sealing ring 710 in accordance with an eighth embodiment of the present invention is illustrated. Sealing ring 710 is substantially identical to sealing ring 310 except that the planar sections 340 and 356 of sealing ring 310 have been eliminated in sealing ring 710. Thus, sealing ring 710 will not be discussed or illustrated in detail herein.

Sealing ring 710 is an internally pressure-energized sealing ring, and includes an annular bight portion 712, a first annular leg portion 14 extending from one end of bight portion 712, and a second annular leg portion 716 extending from the other end of bight portion 712.

Sealing ring 710 is constructed of two plies or annular members 720 and 722 made of a resilient, metallic material. Each ply is preferably approximately 0.005 inch thick. Of course, any suitable thickness from a manufacturing or contact load standpoint can be utilized. The metallic material of plies 720 and 722 can be constructed as any high, temperature resilient material such as an INCONEL, WASPALLOY or any high temperature stainless steel, as well as any newly developed high temperature, resilient material.

First ply 720 is an outer ply which overlies second ply 722 which is an inner ply. Outer ply 720 is nested together with inner ply 722 so that their opposing surfaces are in intimate contact at their interfaces therebetween. Outer ply 720 is in fluid contact with a low pressure fluid. Inner ply 722, on the other hand, is in fluid contact with a high pressure fluid for pressure-energizing sealing ring 710. Inner ply 722 has a first or interior surface 724 which is subjected to the high pressure fluid for pressure-energizing sealing ring 710, while outer ply 720 has a second or exterior surface 726 which is subjected to the low pressure fluid. Thus, sealing ring 710 is an internally pressurized seal, i.e., the high pressure fluid being sealed exerts a radially outwardly extending force on sealing ring 710.

Bight portion 712 includes a convolution 730 interconnected through first and second bends or curved sections 732 and 734 to leg portions 714 and 716, respectively. Accordingly, sealing ring 710 has an E-shaped profile when viewed in longitudinal cross-section. It will be apparent to those skilled in the art that bight portion 712 can have multiple convolutions similar to the sealing ring disclosed in U.S. Pat. No. 5,249,814 to Halling.

Leg portions 714 and 716 are substantially identical, except that leg portion 714 is a mirror image of leg portion 716. Leg portion 714 includes a curved section 742 extending substantially tangentially from bight portion 712 to a free end 744. Curved section 742 includes a curved sealing surface 746 for contacting one of the components being sealed to form an annular fluid-tight seal therebetween.

Likewise, second leg portion 716 includes a curved section 752 extending substantially tangentially from bight portion 712 to a free end 754. Curved section 752 includes an annular sealing surface 756 for engaging the other component being sealed to form an annular fluid-tight seal therebetween.

Curved sections 742 and 752 extend through an arc of at least approximately 180° and preferably slightly larger than 180° so that curved sealing surfaces 746 and 756 fully engage the components being sealed, respectively, to form a pair of annular seals therebetween. The very ends of curved sections 742 and 752 can have a short planar section as seen in the drawings or can continue to be curved to the free ends 744 and 754.

Outer ply 720 adds strength to sealing ring 710, but is not in fluid engagement with the high pressure fluid being constrained by sealing ring 710.

While in this embodiment, two plies 720 and 722 are illustrated in intimate surface contact at their interfaces therebetween, a layer of auto-damping material may be disposed between the plies. Also, while the illustrated embodiment has only two plies, additional plies may be employed, or the two plies may be substituted for a single ply as discussed below. Moreover, plies 720 and 722 can be the same thickness as shown, or different thicknesses as needed and/or desired.

In addition, plies 720 and 722 can be made of materials having either the same or different characteristics and/or compositions. For example, materials can be selected to provide desired expansion characteristics for a particular sealing application, the individual plies may be made of different materials to provide a sealing ring having greater corrosion resistance on one side and more desirable mechanical properties on the other side.

Also, as will be apparent from the other embodiments disclosed herein, bight portion 712 can be modified to be an externally pressurized type seal as discussed below. This embodiment can be coated with a smear plating of a soft metallic material as discussed above.

While various embodiments have been chosen to illustrate the invention, it will be understood by those skilled in the art that various changes and modifications can be made herein without departing from the scope of the invention as defined in the appended claims.

What is claimed is:

1. A non-welded sealing ring in its unstressed state, comprising:

an annular bight portion having at least one curved section extending through an arc with a first substantially smooth concave surface in fluid contact with a first fluid, and a second convex surface in fluid contact with a second fluid;

a first annular leg portion extending from one end of said bight portion to a first non-welded free end thereof, and having a first substantially smooth surface extending coextensively from said first surface of said bight portion to said first free end of said first leg portion, and a second surface extending from said second surface of said bight portion to said first non-welded free end of said first leg portion, said first leg portion having a first substantially u-shaped bent section reversing direction of said first leg portion and a first annular sealing surface formed on said first surface of said first leg portion with said first free end of said first leg portion being in fluid contact with the second fluid; and a second annular leg portion extending from the other end of said bight portion to a second non-welded free end thereof, and having a first substantially smooth surface extending coextensively from said first surface of said bight portion to said second free end of said second leg portion, and a second surface extending from said second surface of said bight portion to said second free end of said second leg portion, said second leg portion having a second substantially u-shaped bent section reversing direction of said second leg portion and a second annular sealing surface on said first surface of said second leg portion with said second free end of said second leg portion being in fluid contact with the second fluid, said first and second sealing surfaces forming an annular sealing line therebetween and dividing said first surface into a pair of first sections and a second section, said curved section of said bight portion being located on a first side of said sealing line together with said first and second free ends of said first and second leg portions, said first and second bent sections of said first and second leg portions being located on a second side of said sealing line which is opposite from said first side of said sealing line, said second section of said first surface lying on said first side of said sealing line being greater in area than said second section of said first surface lying on said second side of said sealing line, said bent sections of said first and second leg portions being shaped as partial circles when viewed in longitudinal cross-section, and which extend approximately 180° to form said first and second annular sealing surfaces.

2. A sealing ring according to claim 1, wherein said annular bight portion extends through an arc of approximately 180°.

3. A sealing ring according to claim 1, wherein each of said first and second leg portions includes a substantially planar portion extending between said bight portion and said bent sections, respectively.

4. A sealing ring according to claim 3, wherein said bight portion is shaped as a partial circle when viewed in longitudinal cross-section, and which extends approximately 180°.

5. A sealing ring according to claim 1, wherein said first surface of said bight portion is exposed towards the center of said sealing ring.

6. A sealing ring according to claim 1, wherein said second surface of said bight portion is exposed towards the center of said sealing ring.

7. A sealing ring according to claim 1, wherein said bight portion is further defined by at least one convolution with a pair of said curved sections extending between said first and second leg portions.

8. A sealing ring according to claim 7, wherein
said bight portion, said first leg portion and said second leg portion are formed of outer and inner annular plies nested together such that said outer ply forms said second surfaces of said bight portion and said leg portions and said inner ply forms said first surfaces of said bight portion and said leg portions.

9. A sealing ring according to claim 7, wherein
each of said first and second leg portions includes a substantially planar portion extending between said bight portion and said bent sections, respectively.

10. A sealing ring according to claim 9, wherein
said curved sections are shaped as partial circles when viewed in longitudinal cross-section, and which extend approximately 180°.

11. A sealing ring according to claim 10, wherein
said bight portion, said first leg portion and said second leg portion are formed of outer and inner annular plies nested together such that said outer ply forms said second surfaces of said bight portion and said leg portions and said inner ply forms said first surfaces of said bight portion and said leg portions.

12. A sealing ring according to claim 11, wherein
said outer and inner annular plies are in intimate surface contact at an interface therebetween.

13. A sealing ring according to claim 7, wherein
said first surface of said bight portion is exposed towards the center of said sealing ring.

14. A sealing ring according to claim 1, wherein
said bight portion, said first leg portion and said second leg portion are formed of outer and inner annular plies nested together such that said outer ply forms said second surfaces of said bight portion and said leg portions and said inner ply forms said first surfaces of said bight portion and said leg portions.

15. A sealing ring according to claim 1, wherein
said bight portion extends through an arc of at least approximately 180°.

16. A sealing ring according to claim 15, wherein
said bight portion extends through an arc of greater than 180°.

17. A sealing ring according to claim 1, wherein
said bight portion is shaped as a partial circle and said first and second surfaces of said bight portion transition into said first and second surfaces of said first and second leg portions, respectively, in a substantially smooth, continuously curved manner.

18. A non-welded sealing ring, comprising:

an annular curved bight portion having at least one curved section extending through an arc of at least approximately 180° with a first radius, said bight portion having a first substantially smooth concave surface in fluid contact with a first fluid, and a second convex surface in fluid contact with a second fluid;

a first annular leg portion extending from one end of said bight portion to a first non-welded free end thereof and having a first substantially smooth surface extending coextensively from said first surface of said bight portion to said first free end of said first leg portion, and a second surface extending from said second surface of said bight portion to said first free end of said first leg portion, said first leg portion having a first bent section extending throught an arc of at least 180° with a second radius and a first annular sealing surface on said first surface of said first leg portion with said first free end of said first leg portion being in fluid contact with the second fluid; and a second annular leg portion extending from the other end of said bight portion to a second non-welded free end thereof, and having a first substantially smooth surface extending coextensively from said first surface of said bight portion to said second free end of said second leg portion, said second leg portion having a second bent section extending through an arc of at least 180° with a third radius and a second annular sealing surface on said first surface of said second leg portion with said second free end of said second leg portion being in fluid contact with the second fluid, said first and second sealing surfaces forming an annular sealing line therebetween and dividing said first surface into a pair of first sections and a second section, said curved bight portion being located on a first side of said sealing line together with said first and second free ends of said first and second leg portions, said first and second bent sections of said first and second leg portions being located on a second side of said sealing line which is opposite from said first side of said sealing line, said first radius of said bight portion being larger than said second radius of said first bent section as well as larger than said third radius of said second bent section, each of said first and second leg portions including a substantially planar portion extending between said bight portion and said bent sections, respectively, each of said planar portions being located at least partially radially beyond said first and second free ends, respectively, towards said bight portion.

19. A sealing ring according to claim 18, wherein
said first surface of said bight portion is exposed towards the center of said sealing ring.

20. A sealing ring according to claim 18, wherein
said second surface of said bight portion is exposed towards the center of said sealing ring.

21. A sealing ring according to claim 18, wherein
said bight portion is further defined by a pair of said curved sections extending between said first and second leg portion and at least one convolution positioned between said curved section.

22. A sealing ring according to claim 18, wherein
said bight portion, said first leg portion and said second leg portion are formed of outer and inner annular plies nested together such that said outer ply forms said second surfaces of said bight portion and said leg portions and said inner ply forms said first surface of said bight portion and said leg portion.

* * * * *